(12) United States Patent
Mandel et al.

(10) Patent No.: US 12,100,087 B2
(45) Date of Patent: *Sep. 24, 2024

(54) SYSTEM AND METHOD FOR GENERATING AN AVATAR THAT EXPRESSES A STATE OF A USER

(71) Applicant: IMPLEMENTATION APPS LLC, Los Angeles, CA (US)

(72) Inventors: Ayla Mandel, Los Angeles, CA (US); David Mandel, Los Angeles, CA (US); Stephen D. Williams, Sunnyvale, CA (US)

(73) Assignee: IMPLEMENTATION APPS LLC, Los Angeles, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/221,078

(22) Filed: Jul. 12, 2023

(65) Prior Publication Data

US 2023/0351663 A1 Nov. 2, 2023

Related U.S. Application Data

(63) Continuation of application No. 18/209,650, filed on Jun. 14, 2023, now Pat. No. 11,790,589, which is a continuation of application No. 18/098,462, filed on Jan. 18, 2023, now Pat. No. 11,688,120, which is a continuation of application No. 17/314,348, filed on May 7, 2021, now Pat. No. 11,600,033, which is a continuation of application No. 15/231,137, filed on
(Continued)

(51) Int. Cl.
*G06T 13/40* (2011.01)
*G06N 5/02* (2023.01)
*G06N 5/04* (2023.01)
*G06T 13/80* (2011.01)

(52) U.S. Cl.
CPC .............. *G06T 13/40* (2013.01); *G06N 5/02* (2013.01); *G06N 5/04* (2013.01); *G06T 13/80* (2013.01)

(58) Field of Classification Search
CPC .......... G06T 13/40; G06T 13/80; G06N 5/02; G06N 5/04
See application file for complete search history.

(56) References Cited

U.S. PATENT DOCUMENTS 6,052,123 A 4/2000 Lection et al.
6,466,213 B2 10/2002 Bickmore et al.
(Continued)

FOREIGN PATENT DOCUMENTS

JP 3859020 B2 * 12/2006 ............. A63F 13/10

OTHER PUBLICATIONS

Souppouris, A., Put Your Face on a Vampire Hunter With Square Enix's 'Bloodmasque,' dated Jul. 25, 2013, http://www.theverge.com/2013/7/25/4555622/bloodmasque-ios-square-enix-hands-on, 2 pages, (retrieved Nov. 8, 2013).
(Continued)

*Primary Examiner* — Maurice L. Mcdowell, Jr.
(74) *Attorney, Agent, or Firm* — McAndrews, Held & Malloy, Ltd

(57) ABSTRACT

A user may create an avatar and/or animated sequence illustrating a particular object or living being performing a certain activity, using images of portions of the object or living being extracted from a still image or set of still images of the object or living being.

16 Claims, 7 Drawing Sheets

Related U.S. Application Data

Aug. 8, 2016, now Pat. No. 11,127,183, which is a continuation of application No. 14/178,525, filed on Feb. 12, 2014, now Pat. No. 9,412,192, which is a continuation of application No. 13/963,940, filed on Aug. 9, 2013, now Pat. No. 9,177,410.

(56) References Cited

U.S. PATENT DOCUMENTS

| | | | |
|---|---|---|---|
| 6,697,072 | B2 | 2/2004 | Russell et al. |
| 7,468,729 | B1 | 12/2008 | Levinson |
| 7,707,520 | B2 | 4/2010 | Ashtekar et al. |
| 7,859,551 | B2 | 12/2010 | Bulman et al. |
| 8,130,225 | B2 | 3/2012 | Sullivan et al. |
| 8,144,153 | B1 | 3/2012 | Sullivan et al. |
| 8,502,825 | B2 | 8/2013 | Zalewski et al. |
| 8,655,053 | B1 * | 2/2014 | Hansen .................. G06Q 10/10 382/154 |
| 8,681,158 | B1 | 3/2014 | Sullivan et al. |
| 9,177,410 | B2 * | 11/2015 | Mandel ..................... G06N 5/04 |
| 9,412,192 | B2 | 8/2016 | Mandel et al. |
| 10,155,168 | B2 | 12/2018 | Blackstock et al. |
| 10,937,169 | B2 | 3/2021 | Dharur et al. |
| 11,127,183 | B2 | 9/2021 | Mandel et al. |
| 11,600,033 | B2 | 3/2023 | Mandel et al. |
| 2003/0038800 | A1 | 2/2003 | Kawahara |
| 2005/0223328 | A1 | 10/2005 | Ashtekar et al. |
| 2007/0168863 | A1 | 7/2007 | Blattner et al. |
| 2008/0001951 | A1 * | 1/2008 | Marks ..................... G06F 3/011 463/31 |
| 2008/0225044 | A1 | 9/2008 | Huang et al. |
| 2009/0002178 | A1 * | 1/2009 | Guday .................. A61B 5/0002 340/573.1 |
| 2009/0257576 | A1 | 10/2009 | Wellard et al. |
| 2010/0083324 | A1 | 4/2010 | Smith et al. |
| 2010/0211397 | A1 * | 8/2010 | Park ..................... G06V 40/176 382/218 |
| 2010/0251147 | A1 * | 9/2010 | Donovan ................ G06T 13/80 715/728 |
| 2010/0309226 | A1 | 12/2010 | Quack et al. |
| 2011/0007142 | A1 * | 1/2011 | Perez ..................... G06T 13/80 348/E7.085 |
| 2011/0148857 | A1 | 6/2011 | Krupka et al. |
| 2011/0239147 | A1 | 9/2011 | Shim et al. |
| 2011/0292051 | A1 | 12/2011 | Nelson et al. |
| 2011/0305376 | A1 | 12/2011 | Neff |
| 2012/0130717 | A1 | 5/2012 | Xu et al. |
| 2013/0086519 | A1 | 4/2013 | Fino |
| 2013/0159228 | A1 | 6/2013 | Meijer et al. |
| 2013/0243245 | A1 | 9/2013 | Bill |
| 2013/0275352 | A1 | 10/2013 | Servi et al. |
| 2013/0287365 | A1 | 10/2013 | Basapur et al. |
| 2014/0160149 | A1 | 6/2014 | Blackstock et al. |
| 2014/0218371 | A1 * | 8/2014 | Du .......................... G06T 13/40 345/473 |
| 2014/0313208 | A1 | 10/2014 | Filev et al. |
| 2017/0357417 | A1 * | 12/2017 | Goossens ............ G06F 3/04883 |
| 2021/0118323 | A1 * | 4/2021 | Quy ....................... H04L 67/535 |
| 2021/0295579 | A1 * | 9/2021 | Davis ..................... G06N 3/006 |

OTHER PUBLICATIONS

Live Vicariously Through Yourself, http://www.easports.com/gameface, 1 page, (retrieved Nov. 8, 2013).

FaceCake Marketing Technologies, http://www.facecake.com, 6 pages, (retrieved Dec. 11, 2013).

A New Physical Model with Multilayer Architecture for Facial Expression Animation Using Dynamic Adaptive Mesh by Yu Zhang pp. 339-352 May/Jun. 2004 IEEE Transactions on Visualization and Computer Graphics, Appendix pp. 27-32.

"Textons, the elements of texture perception, and their interactions" by B. Julesz, Nature, 290(5802):91-97, Mar. 1981.

"Contour and Texture Analysis for Image Segmentation" by Malik, et al., International Journal of Computer Vision, 43(1):7-27, Jun. 2001.

Lubomir Bourdev, PhD., "Poselets and Their Applications in High-Level Computer Vision", a Thesis of Lubomir Bourdev, University of California, Berkeley, Spring, 2011, pp. 1-66, found at <www.eecs.berkeley.edu/~lbourdev/poselets/bourdev_thesis.pdf> on Jun. 1, 2013.

Carl Yuheng Ren, et al., "gSLIC—a real-time implementation of SLIC superpixel segmentation," Jun. 28, 2011, pp. 1-6, University of Oxford, Department of Engineering Science, Oxford, UK, found at <http://www.robots.ox.ac.uk/~carl/papers/gSLIC_report.pdf> on Jun. 21, 2013.

Brian Fulkerson, et al., "Class Segmentation and Object Localization with Superpixel Neighborhoods," 8 pages, University of California, Department of Computer Science, Los Angeles, CA, and University of Oxford, Department of Engineering Science, Oxford, UK, found at <ftp://ftp.umiacs.umd.edu/.snapshot/daily.0/pub/chenxi/Project%20FTP/OLD/Submodular/Class%20Segmentation%20and%20Object%20Localization%20with%20Superpixel%20Neighborhoods.pdf> on Jun. 21, 2013.

Zhenguo Li, et al., "Segmentation Using Superpixels: A Bipartite Graph Partitioning Approach," 8 pages, Columbia University, Dept. of Electrical Engineering, New York, found at <http://www.ee.columbia.edu/ln/dvmm/pubs/files/CVPR_BGraph.pdf> on Jun. 21, 2013.

Dollar et al., "Pedestrian Detection—An Evaluation of the State of the Art," pp. 1-20, Submission to IEEE Transactions on Pattern Analysis and Machine Intelligence, found at <http://vision.ucsd.edu/~pdollar/files/papers/DollarPAMI12peds.pdf> on Jun. 21, 2013.

Volker Blanz, et al., "A Morphable Model for the Synthesis of 3D Faces," 8 pages, Max-Planck-Institut fur biologische Kybernetik, Tubingen, Germany, found at <http://gravis.cs.unibas.ch/publications/Sigg99/morphmod2.pdf> on Jul. 11, 2013. Video also available at <http://gravis.cs.unibas.ch/Sigg99.html> as of Jul. 11, 2013.

Shai Avidan, et al., "Seam Carving for Content-Aware Image Resizing," 9 pages, Mitsubishi Electric Research Labs, The Interdisciplinary Center & MERL, found at <http://www.win.tue.nl/~wstahw/2IV05/seamcarving.pdf> on Jul. 11, 2013.

Bo Wu, et al., "Simultaneous Object Detection and Segmentation by Boosting Local Shape Feature based Classifier," 2007, 8 pages, IEEE Conference on Computer Vision and Pattern Recognition 2007 (CPVR '07), Found at <http://iris.usc.edu/outlines/papers/2007/wu-nev-cvpr07.pdf> on Jun. 10, 2013.

Marco Andreetto, et al., "Non-Parametric Probabilistic Image Segmentation," 8 pages, Department of Electrical Engineering, California Institute of Technology, Pasadena, CA, 91125, USA, found at <http://www.vision.caltech.edu/marco/archive/ICCV07.pdf> on Jun. 10, 2013.

Pedro F. Felzenszwalb, et al., "Efficient Graph-Based Image Segmentation," pp. 1-26, Pedro F. Felzenszwalb (Artifcial Intelligence Lab, Massachusetts Institute of Technology) and Daniel P. Huttenlocher (Computer Science Department, Cornell University), found at <http://cs.brown.edu/~pff/papers/seg-ijcv.pdf> on Jun. 10, 2013.

William R. Schwartz, et al., "A Robust and Scalable Approach to Face Identification," 14 pages, University of Maryland, A.V. Williams Building, College Park, MD, 20742, found at <http://www.umiacs.umd.edu/~lsd/papers/william_ECCV_FaceRecognition.pdf> on Jul. 16, 2013.

Jamie Shotton, et al., "TextonBoost for Image Understanding: Multi-Class Object Recognition and Segmentation by Jointly Modeling Texture, Layout, and Context," Jul. 2, 2007, pp. 1-30, Jamie Shotton (Machine Intelligence Laboratory, University of Cambridge), John Winn, Carsten Rother, Antonio Criminisi (Microsoft Research Cambridge, UK), found at <http://citeseerx.ist.psu.edu/viewdoc/download?doi=10.1.1.126.149&rep=rep1&type=pdf> on Jun. 10, 2013.

Hyung Il Koo, et al., "Boosting Image Segmentation," 2008, pp. 3192-3195, 15th IEEE Conference on Image Processing 2008 (ICIP 2008), School of Electrical Engineering, Seoul National University, Seoul 151-744 Korea, found at <https://ieeexplore.ieee.org/xpl/login.jsp?tp=&arnumber=4712474&url=http%3A%2F%2Fieeexplore.ieee.org%2Fxpls%2Fabs_all.jsp%3Farnumber%3D4712474> on Jun. 10, 2013.

(56) References Cited

OTHER PUBLICATIONS

Huynh Thi Thanh Binh, et al., "Improving image segmentation using genetic algorithm," 2012, pp. 18-23, Huynh Thi Thanh Binh and Mai Dinh Loi (School of Information and Communication Technology) and Nguyen, Thi Thuy (Dept. of Computer Science, Faculty of Information Technology) at Hanoi University, Hanoi, Vietnam, found at <https://ieeexplore.ieee.org/xpl/login.jsp?tp=&arnumber=6406719&url=http%3A%2F%2Fieeexplore.ieee.org%2Fxpls%2Fabs_all.jsp%3Farnumber%3D6406719> on Jun. 10, 2013.

Brian Holt, et al., "Putting the Pieces Together: Connected Poselets for Human Pose Estimation," 6 pages, 2011 IEEE International Conference on Computer Vision Workshops (ICCV Workshops) (CVSSP), University of Surrey, Guildford, Surrey GU2 7XH, UK, found at <http://ieeexplore.ieee.org/xpl/login.jsp?tp=&arnumber=6130386&url=http%3A%2F%2Fieeexplore.ieee.org%2Fiel5%2F6114268%2F6130192%2F06130386.pdf%3Farnumber%3D6130386> on Jul. 17, 2013.

Song-Chun Zhu, et al., "What Are Textons?," European Conference on Computer Vision (ECCV) 2002, vol. 4, LNCS 2353, Copyright 2002, Springer-Verlag Berlin Heidelberg, pp. 793-807.

http://smartbody.ict.usc.edu/video, 15 pages, retrieved on Mar. 8, 2016.

http://smartbody.ict.usc.edu, 3 pages, retrieved on Mar. 8, 2016.

http://smartbody.ict.usc.edu/autoriggerandreshaper, 8 pages, retrieved on Mar. 8, 2016.

https://sourceforge.net/projects/smartbody, 3 pages, retrieved on Mar. 8, 2016.

http://smartbody.ict.usc.edu/download2, 3 pages, retrieved on Mar. 8, 2016.

http://steersuite.eecs.yorku.ca/, 2 pages, retrieved on Mar. 8, 2016.

https://github.com/SteerSuite/Release, 7 pages, retrieved on Mar. 8, 2016.

http://opensteer.sourceforge.net, 1 page, retrieved on Mar. 8, 2016.

https://sourceforge.net/projects/opensteer, 3 pages retrieved on Mar. 8, 2016.

Chai et al. "Vision-based control for 3D facial animation", published 2003.

\* cited by examiner

SYSTEM AND METHOD FOR GENERATING AN AVATAR THAT EXPRESSES A STATE OF A USER

CROSS-REFERENCE TO RELATED APPLICATIONS

The present application is a continuation of U.S. patent application Ser. No. 18/209,650, filed Jun. 14, 2023, which is a continuation of U.S. patent application Ser. No. 18/098, 462, filed Jan. 18, 2023 (now U.S. Pat. No. 11,688,120), which is a continuation of U.S. patent application Ser. No. 17/314,348, filed May 7, 2021 (now U.S. Pat. No. 11,600, 033), which is a continuation of U.S. patent application Ser. No. 15/231,137, filed Aug. 8, 2016 (now U.S. Pat. No. 11,127,183), which is a continuation of U.S. patent application Ser. No. 14/178,525, filed Feb. 12, 2014 (now U.S. Pat. No. 9,412,192), which is a continuation of U.S. patent application Ser. No. 13/963,940, filed Aug. 9, 2013 (now U.S. Pat. No. 9,177,410). Each of the above identified documents is hereby incorporated herein by reference, in its respective entirety.

FIELD OF THE INVENTION

Certain embodiments of the invention relate to systems and methods for producing animated content. More specifically, certain embodiments of the present invention relate to a system and method for creating an avatar and/or an associated animated sequences from features of an object or living being extracted from a composite still image.

BACKGROUND OF THE INVENTION

Animated sequences illustrating human or cartoon activity for instructional or entertainment purposes have traditionally been drawn by artists and creators cell by cell using pencil and paper or paintbrush and a clear sheet. In recent years, creation has increasingly been aided through the use of computer graphics systems designed to automate aspects of production, improving quality and reducing the amount of time needed. Such systems are typically expensive and complex, and have been designed primarily with high quality animation in mind. Automated systems for shopping mall kiosk creation of video entertainment sequences capture the facial image of a user employing "green screen" techniques and physical props to isolate the face of the user from the remainder of their appearance, and then place the isolated image of the user's face within a stock video action sequence. While requiring little from the user, such systems are very limited in their functionality and flexibility.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method for creating an avatar and/or an animated sequence from features of an object or living being extracted from a composite still image, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Figure 1:
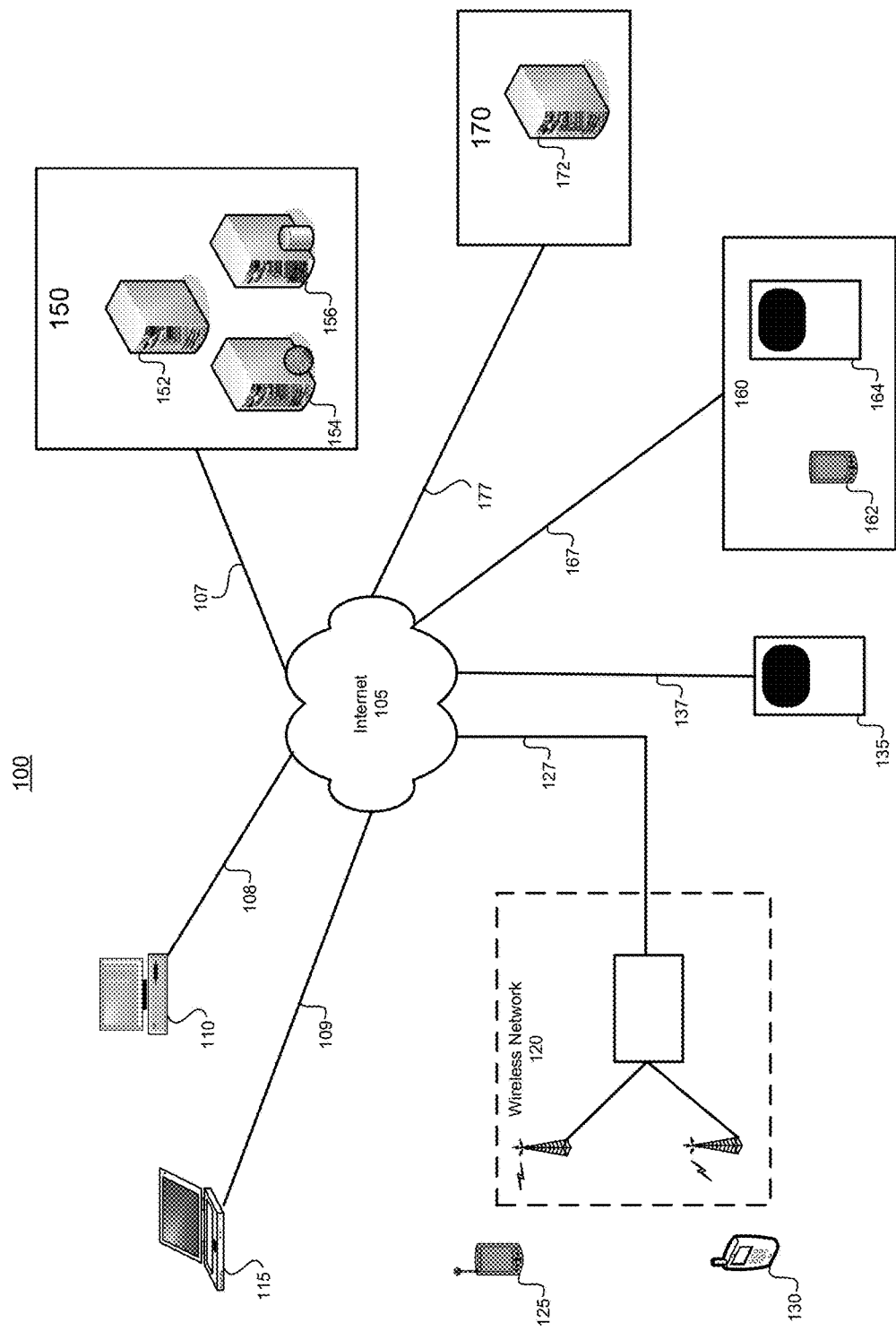
FIG. 1 is a block diagram illustrating an exemplary system on which a representative embodiment of the present invention may be practiced.

Aspects of the present invention relate to systems and methods for producing an avatar(s) and/or associated animated graphics. More specifically, certain embodiments of the present invention relate to a system and method for creating an avatar(s) and/or an associated animated sequence from features of an object or living being extracted from a composite still image.

A representative embodiment of the present invention permits a user to create an avatar(s) and/or an associated animated sequence illustrating a particular individual performing a certain activity, using images of human body features extracted from one or more still images of the individual, other individuals, and/or other objects. The resulting avatar and/or associated animated sequence may be created to include recognizable facial or other features of the individual(s)/objects, and may, for example, be suitable for exchange over the Internet, or as part of a game or other activity.

A representative embodiment of the present invention may be used to create a certain look and feel, and a certain emotional/personal connection with the user, because the avatar and/or animated sequence comes from objects or living beings that the user has a personal connection to, whether photos/images of the user, or objects or living beings from social media and other media sources that the user chooses as source material.

While the following discussion provides example uses of the systems and methods of representative embodiments of the present invention, these are offered for illustrative purposes only, and do not necessarily represent specific limitations unless explicitly recited by the claims.

The term "avatar" may be used herein to refer to a movable image or model that represents a living being or thing in a virtual reality environment or in cyberspace. An avatar may be two dimensional (2D) or three dimensional (3D), and a 3D model for an avatar may be rendered to produce a 2D image for display to a user.

The term "composite image" may be used herein to refer to an image containing a variety of objects or living beings, including an object or living being of interest, which are distributed within the composite image, and that may or may not overlap one another and occlude or block visibility of portions of one another, in contrast to an image containing only the object or living being of interest against a plain, uniform, or homogenous background.

The term "texture" may be used herein to refer to the visual appearance of a material or shading or other attributes added to the "surface" of a graphical image to give the illusion of a physical substance.

The terms "texture map" and "texture mapping" may be used herein to refer to the process of applying an image to a surface. The term "mesh" may be used herein to refer to a group of polygons which are connected by shared vertices. Mesh or polygonal modeling may be used to represent the surfaces of a three-dimension object or living being. The terms "vertex" and "vertices" may be used herein to refer to a point in three-dimensional space, the term "edge" may be user herein to refer to two points connected by a straight line, and the term "polygon" may be used herein to refer to a closed planar figure consisting of a set of three or more points joined by a corresponding number of edges. The term "render" may be used herein to refer to the process of generating an image from a model or models, by means of computer programs.

The terms "user" and "end-user" may be used interchangeably to refer to a person that employs a system or method as described herein to produce an avatar and/or animated sequence for their own use, possibly from image(s) they have selected, in contrast to the administrators, makers, or developers of such methods and systems.

As utilized herein, the terms "exemplary" or "example" mean serving as a non-limiting example, instance, or illustration. As utilized herein, the term "e.g." introduces a list of one or more non-limiting examples, instances, or illustrations.

In accordance with a representative embodiment of the present invention, a user may, for example, desire to use an image of him/herself, of another, or of their pet or other animal(s)/object(s) in an animated sequence showing them, for example, climbing a mountain, riding a bicycle, playing a game, or taking part in another activity. The user may identify/designate/select a stored composite image in which they appear, or they may ask a system in accordance with the present invention to capture their image and to then search local and/or external storage to find stored composite image(s) in which their captured image appears. In some representative embodiments of the present invention, one or more interpretations of the composite image(s) may be displayed, showing the location(s) that the system has identified as being an image of the user. This allows the system to present alternative interpretations sorted by a ranking criterion such as, for example, probability of a likeness match, for consideration and selection by the user, and increases the chance that the best interpretation is available to the user for use in creating an avatar and/or animated sequence.

The user may then choose a composite image to be used for creation of the avatar(s) and/or associated animated sequence from those found by the search. The user may then choose the form of animation (e.g., climbing, running, walking, playing) they desire, and may choose a background scene in which they wish their image to appear. A representative embodiment of the present invention may then analyze the user-selected composite image to recognize and extract portions of the user image appearing in the user-selected composite image, that are needed for the chosen animation. The extracted portions of the user image may then be embodied in an avatar(s) and animated according to the form of animation chosen by the user, and an animated sequence may be assembled by compositing the avatar and animation of the extracted portions of the composite image with the background scene chosen by the user. In some representative embodiments of the present invention, the background scene may be automatically provided to the user based on user selection or preferences, or may be retrieved from various sources of stored images belonging to the user or external sources available to the public, based upon a textual description provided by the user.

FIG. 1 is a block diagram illustrating an exemplary system 100 on which a representative embodiment of the present invention may be practiced. As illustrated in FIG. 1, the system 100 includes a computer system 150 comprising one or more web servers 154, one or more database servers 156, and one or more application servers 152. The elements of the computer system 150 may be interconnected, and may singly or as a group be connected to Internet 105 via communication link 107, which may employ any suitable combination of wired or wireless data communication links. FIG. 1 also includes personal computers (PCs) 110, 115, which are connected to the Internet 105 by communications links 108, 109, respectively, which may be any suitable combination of wired or wireless data communication links. PCs 110, 115 may be any of, for example, a desktop computer, a laptop computer, a notebook computer, a netbook computer, a tablet computer, a smartphone/cell phone, or any other electronic device such as, for example, a television having computing and communication functionality. Such PCs and other electronic devices may, for example, have capabilities suitable for accessing the Internet 105 from, for example, a home, a small business, or any private or public area having suitable support for communications links 108, 109. The PCs 110, 115 may equipped with capability to capture images using, for example, an integrated or accessory/external digital imaging device, or an external digital camera. Images captured by an integrated or an accessory/external imaging device may be stored at any suitable location including, for example, the PCs 110, 115 and the computer system 150.

In addition, FIG. 1 illustrates a user communication device 125 that may comprise, for example, a tablet computer, a smart phone, or other handheld electronic device that may, for example, be capable of operating as a stand-alone computing platform, in addition to or alternatively communicating with the computer system 150 via a wireless network 120, a communication link 127, and the Internet 105. The communication device 125 of FIG. 1 may include suitable software applications, hardware, and logic to permit the communication device to display, for example, locally generated images or received web pages and other forms of digital information on a display of the communication device 125, and suitable user interface (UI) elements to permit a user to interact with the computer system 150 using tactual, speech, and other forms of input. The communication device 125 may also be equipped with one or more integrated image capture devices (not shown), or may be able to capture images using an external imaging device such as a video camera or digital imager. Images captured by an integrated image capture device or an external imaging device may be stored at any suitable location including, for example, the communication device 125 and the computer system 150. The wireless network 120 may support communication of digital information using any suitable wireless access technology including, for example, any combination of short-range, long range, Wi-Fi, cellular, personal communication system (PCS), Bluetooth, Near Field communication (NFC), to name only a few possible air interface technologies.

FIG. 1 also includes a portable telephone 130 that may be capable of communicating over one or more of a cellular, PCS, Wi-Fi, or other wireless communication network, and may have more limited yet sufficient functionality to interact with the computer system 150 than that available from the PCs 110, 115 and the communication device 125.

In addition, FIG. 1 illustrates a kiosk device 135, which may permit users in retail and public venues to engage in various activities described herein, which may or may not access the computer system 150. The kiosk device 135 may be designed for indoor or outdoor use, and may be linked to the e-commerce platform 150 via a communication link 137 and Internet 105, as shown, or may communicate directly with the computer system 150 using any other suitable wired or wireless means. The kiosk 135 may have functionality that is equivalent, greater than, or less than the personal computers 110, 115, the communications device 125, and the cellular telephone 130.

The illustration of FIG. 1 also shows a business establishment 160 that may, for example, be a "brick-and-mortar" business associated with the operator or sponsor of the computer system 150. The business establishment 160 may include a kiosk 164 that may support access to the computer system 150 from the business establishment 160, for those users that are located within or outside of the business establishment 160. The illustration of FIG. 1 also includes a communication device 162 that may belong to, or be loaned to a customer of or visitor to the business establishment 160, permitting the customer/visitor to, for example, entertain themselves by send and receive messages or participate in various activities such as, by way of example and not limitation, single or multi-user activities/games such as, for example, education and gaming, and many others. Users of communication devices within the business establishment 160 such as, for example, the communication device 162 and the kiosk 164 may be enabled to communicate with each other and the computer system 150 via the Internet 105 and the communication link 167, which may be, for example, any suitable combination of wired and/or wireless communication technologies.

In addition, the system 100 of FIG. 1 includes an application/web server 170 that may, for example, be operated by a third-party provider of applications selectable by users of the computer system 150, and that may be arranged to interact with elements of the computer system 150, as described more fully below.

In a representative embodiment of the present invention, a device such as, for example, the computer system 150 or user communication device 125 may be used to create an avatar and/or an associated animated sequence from one or more still image(s) as described herein. Some representative embodiments of the present invention may use suitable hardware, software, and/or logic circuitry to implement object recognizers that identify or recognize in composite images portions of objects or living beings such as, by way of example and not limitation, a human being, an animal such as, for example, a dog, cat, or horse, or objects such as a car/motorcycle. In such a representative embodiment, an object recognizer to be associated with a particular portion of an image (an "image patch") of an object or living being (e.g., a human being) may be trained using a set of image patches that have the same local configuration of "keypoints" such as, for an example of a human being, the eyes, nose, shoulders, hips, etc., and use them as positive training examples. A representative embodiment of the present invention employs a database of recognizable objects defined in part, in terms of such "keypoints." However, in order to animate portions of an image that have been recognized, a representative embodiment of the present invention employs additional information about the location(s) of underlying anatomical feature(s) of the portion of the recognized object or living being. Such information may, for example, be in the form of reference models of various objects or living beings such as, by way of example and not limitation, humans, dogs, cats, horses, and cars. Such reference models may include, by way of example and not limitation, information identifying the location of points within the reference model that correspond to keypoints of image portions recognized using any of a number of object recognition approaches. Such a reference model may then be used as a framework onto which portions of the source image associated with recognized image portions (e.g., recognized body parts) are texture mapped to form a moveable model, in creating an animation of the recognized image portions.

It should be noted that the discussion that follows describes, by way of example and not limitation, the creation of an avatar or an animated sequence using, in part, a particular object recognition tool in the form of a "poselet." Further information about the use of "poselets" may be found, for example, in a PhD dissertation submitted by Lubomir Bourdev at the University of California at Berkeley in Spring of 2011, the complete subject matter of which is hereby incorporated herein by reference, in its entirety. The reference to the use of "poselets" in the illustrative examples that follow does not necessarily represent a specific limitation of the present invention, unless explicitly recited in the claims, as the inventive concepts described herein may use other approaches to, for example, segment images, recognize objects or body parts, and extract image portions to be used in the creation of an avatar or an associated animated sequence in accordance with a representative embodiment of the present invention. Further, a representative embodiment of the present invention may, for example, use a number of different techniques, in combination (i.e., "boosting"), in series or in parallel, where in some representative embodiments, results from each of the algorithms may be weighted to determine the outcome, to improve the accuracy, quality, or speed of the image analysis, enabling the creation of an avatar or animated sequence of higher quality in a shortened amount of time, and or adjusted to run satisfactorily on platforms having various levels, or limited, computing resources (e.g., ranging from desktop personal computers down to handheld computers, game systems, and smart phones).

For example, image segmentation and object recognition may also be done using an approach based on what are referred to as "textons," in place of or in addition to the use of algorithms for the recognition of "poselets". Such an approach may, for example, use the Microsoft Research Cambridge (MSRC) image database to train object class models. The MSRC database is composed of 591 photographs of 21 object classes. Additional information about the MSRC image database may be found at http://research.microsoft.com/vision/cambridge/recognition/. Additional information about the concept of a "texton" may be found, for example, in "Textons, the elements of texture perception, and their interactions" by B. Julesz, *Nature*, 290(5802):91-97, March 1981, in "Contour and Texture Analysis for Image Segmentation" by Malik, et al., *International Journal of Computer Vision*, 43(1):7-27, June 2001, and in "TextonBoost for Image Understanding: Multi-Class Object Recognition and Segmentation by Jointly Modeling Texture, Layout, and Context" by J. Shotton, J. Winn, C. Rother, and A. Criminisi, *International Journal of Computer Vision*, Springer Verlag, January 2009, the complete subject matter of each of which is hereby incorporated herein by reference, in its respective entirety.

To illustrate, by way of example and not limitation, in some representative embodiments of the present invention, a first approach may be used to perform object recognition and image segmentation, and a second approach may then be used upon the image data of a recognized object (e.g., a human), to more effectively recognize various image subportions known to be part of the object identified by the use of the first approach.

In a representative embodiment of the present invention, an object recognition algorithm for recognizing a particular portion of an object or living being may maintain information that identifies other portions of the object or living being that are adjacent to the particular portion in the anatomy of the object or living being of interest, and may include identified reference points (e.g., relative to "keypoints") and parameters for the underlying skeletal features that may define dimensions of features (e.g., in a human, a femur or a tibia), or define, limit or constrain motion of the underlying skeletal features/parts relative to one another (e.g., a knee joint or an elbow joint) of the object or living being of interest.

For example, in one representative embodiment of the present invention, a set of image recognizers may be trained for recognition of parts of a living being such as, for example, a human being, or parts of inanimate objects such as, for example, a bicycle or a car. Each image recognizer may be associated with information identifying the location(s) of underlying features of the portion of the human skeleton (e.g., the bones and joints) or object (e.g., a axel of a wheel, the post of a set of handlebars, or the post of a bicycle seat) within the boundaries of the portion of the human body/object that the image recognizer has been designed or trained to recognize. The underlying features may be defined in terms of, by way of example for a human being and not limitation, the endpoints of skeletal elements, the location(s) of joints, and/or other suitable reference points of particular body parts such as, for example, the endpoint(s) of the bone(s) of an upper arm, a lower arm, a finger, a lower leg, or an upper leg, and the location(s) of the joint(s) that interconnect those body parts. The information identifying the location(s) of underlying features of the portion of the human skeleton associated with each recognized image portion may, for example, correspond to reference points/locations of a movable model, to permit mapping of portions of the source image to the surface of the movable model.

The positional relationships of the various portions of the object or living being to be recognized may be defined. For example, an object recognizer that is trained to recognize an image portion comprising a particular view of a left elbow, a portion of the associated upper left arm, and a portion of the associated lower left arm may be implemented. The object recognizer trained to recognize an image portion comprising a similar view of a portion of the lower left arm and associated left hand may also be implemented. The physical relationship of the parts of the human body that those object recognizers are trained to recognize may be defined (e.g., in terms of relative locations of keypoints), such that when an object recognizer recognizes a first body part in an image, a finite number of locations of the reference points of other nearby or adjacent body parts may be estimated based on the known relationship(s) of the portions of the human body that correspond to the recognized first body part. By using the known positional relationships of the adjacent image portions recognized by an image recognizer, and the features (e.g., dimensions and interconnections or joints) of the underlying skeletal parts or elements, a representative embodiment of the present invention may then apply a user-selected sequence of motion, described by what is referred to herein as a "motion template," to define the motion of particular skeletal features of the object or living being of interest (e.g., reference points for features of the hands, elbows, knees, and/or feet of a human being, the pedals and wheels of a bicycle). For example, a motion template in some representative embodiments of the present invention may comprise a time ordered series of magnitude and direction information in two or three dimensions, for each of the specific reference points of the components of the object or living being to be animated. When combined with the defined relationships of anatomical reference points and the interconnection of skeletal parts at, for example, the joints, the motion of the underlying features of the skeleton of the living being of interest may be defined. Using the motion of the reference points of the underlying skeletal features, the motion of the portion of the extracted image of the object or living being of interest may then be determined.

In order to improve the appearance of the resulting animated images, a representative embodiment of the present invention may match and/or blend visual features (e.g., texture information related to fabric pattern, color boundaries, shading, fabric creases) of the adjacent animated image portions, by matching the visual feature(s) in the image portions corresponding to adjacent recognized image portions. For example, additional image details such as creases or folds (e.g., created by shading or shadowing in the image) in the fabric of clothing or the skin of the person of interest may be generated based upon the relative motion of underlying skeletal features, and therefore corresponding to the motion of the corresponding parts of the body of the object or living being of interest. For example, whether the arm is clothed (i.e. person wearing a shirt) or bare, a crease typically forms in the fabric of a shirt or blouse, or in the skin on the inside of the elbow joint of a human being when the lower and upper portions of an arm are moved from a straightened position to a bent position. While the lighting conditions may change the exact appearance, crease(s) or fold(s) still form a visual artifact that may be approximated when the relative positions of the underlying skeletal features (e.g., the upper and lower arms at the elbow joint) are in certain known relationships. Mapping of texture information from recognized portions of a source image to a corresponding portion of the surface contour of a 3D model of an anatomically typical object or living being of interest permits the generation of an avatar and/or animated sequence with realistic the appearance.

A representative embodiment of the present invention may create an avatar by mapping texture information extracted from recognized portions of one or more image(s) of an object or living being to be represented, onto a generic or "average" 2D or 3D model of the object or living being to be represented. In one representative embodiment, for example, creation of a facial portion of an avatar may use a morphable 3D face model that is a multidimensional 3D morphing function based on a linear combination of a large number of actual 3D scans of human faces. The morphable 3D model may be automatically matched/adjusted to information derived from a 2D image selected by an end-user. Although other approaches may be employed, an example of one suitable technique using a 3D model may be found in "A Morphable Model for the Synthesis of 3D Faces" by Volker Blanz and Thomas Vetter of the Max Planck Institut fur Bologische Kybernetik, available at <http://gravis.cs.unibas.ch/Sigg99.html>, the complete subject matter of which is hereby incorporate herein by reference in its entirety. In a representative embodiment of the present invention, such an approach may be extended as described above for use in creating a tunable, meshed, 3D model representing other portions or the entirety of a human body, in which shape and texture vectors may be modified according to multiple parameters including, by way of example and not limitation, weight, emotion, behavior or activity, and gender, enabling the creation of a 3D movable model for an avatar that may be rendered for viewing from any angle.

In a representative embodiment of the present invention, an end-user may modify shape and/or texture vectors, or any other suitable parameters, to create an avatar from a 3D model that is a faithful or "true" representation of aspects of an original 2D image, or may create an avatar from a 3D model in which certain properties or attributes of the avatar are modified from the original 2D image in certain prescribed or preset ways, which may be user definable. In another representative embodiment of the present invention, a 2D model may be used. For instance, by way of example and not limitation, the user may be enabled to select from one of a number of preset or predefined, or end-user-defined modifications that may include, by way of example and not limitation, a fun-house mirror face, an angry face, and a smiling face. In some representative embodiments of the present invention, the system may include any functionality needed for the end-user to create new instances, or modify existing instances of 2D or 3D shape and texture information to produce things/beings of their own creation, to be included with shape and texture information scanned from similar objects or live subjects, and transformed into the vector space representation mentioned above. In this way, a representative embodiment of the present invention allows an end-user to later adjust or tune the 2D or 3D model to create an avatar having unusual features not present in human subjects (e.g., space aliens or never-before-seen animals and plants, and other variations).

In a representative embodiment of the present invention, animation of the resulting 2D or 3D model according to user-selected or customized motion information (e.g., a user-selected or user-customized motion template) may then be used in rendering image information for display via a 2D or 3D medium such as, for example, a mobile or other device having a 2D or 3D-capable display. Such a motion template may comprise, by way of example and not limitation, a time ordered list of distance vectors in two-space or three-space for each reference point in a movable model and/or formula for calculation of the position of each of one or more reference points in a movable model based on time.

Further, a representative embodiment of the presented invention may derive emotion/mood information. Such emotion/mood information may be derived, for example, from an analysis of user responses to system-generated questions, analysis of captured images of the user's face or body (e.g., details of the eyes and mouth, or body pose), or system analysis (e.g., using keyword frequency or natural language analysis) of various news items from information sources), which may be used to adjust/tune the facial features/pose of the avatar to reflect the emotion/mood of the user. A system in accordance with a representative embodiment of the present invention may also provide controls for the end-user to manually adjust various parameters to "touch-up" the appearance of the avatar to their liking.

In some representative embodiments of the present invention, the algorithms used for the generation of an avatar and/or an animated sequence from a still image may be user-adjustable according to the age, sophistication, taste, or whim of the user. For example, within the capabilities of a particular implementation of the present invention, the algorithms may be adjusted by the user to produce a less accurate representation of the appearance of the animated figure from the still image of a subject extracted from a composite image, in order to reduce the complexity of the computations, the demand on computational resources used, and the time needed to generate the animation. For example, one user may choose to have a representative embodiment of the present invention more quickly generate an animated sequence that appears to have been assembled from portions simply cut from a 2D image without, for example, the blending of shades or color or nuances of lighting, the matching of fabric patterns, and the recognition or addition of crease or folds due to motion, using the computing resources of a smart phone, a laptop, or a tablet computer. Another user, however, having a more powerful computing platform on which the animation may be generated and displayed, or for whom more accurate images are important, may choose a higher level of accuracy of representation. A higher level of accuracy of representation may take more time to produce, consume more memory and processor resources during generation of the animated sequence, and may therefore require a computing platform that cannot be carried on the person of the user, but may instead be accomplished by the mobile computing platform in conjunction with remote cloud computing resources. Further, the user may choose to adjust operating parameters to permit a representative embodiment of the present invention to display an animated sequence as it is rendered from the movable model, in which the user is directing the motion using an input device, rather than generating the animation using a motion template.

In view of the number of devices such as, for example, cell phones, smart phones, web cameras, net book/tablet/laptop/desktop computers, and handheld gaming platforms that now contain high quality imaging devices, a large volume of digital images, both single still images and as frames from motion video, are currently stored either on their respective devices, backed up and synced with other devices, and/or "in the cloud" and are available to a large portion of the population.

The stored image information likely includes a wide variety of arrangement/positions of objects or living beings of interest, offering the opportunity to select from the available image data, those images that produce more favorable results in the use of, by way of example and not limitation, a particular object recognition approach and various image extraction techniques, than may be seen in particular applications of those technologies such as, for example, those in which the subject is positioned in a manner for which the underlying algorithms do not perform well (e.g., when seated).

In some representative embodiments of the present invention, the user may be requested to aid the algorithms for object recognition and/or extraction of an image of an object or living being (e.g. their own image) from a composite image. This may occur, for example, for images that are "low quality" due to, by way of example and not limitation, adverse lighting conditions during image capture, similarity in the color of the image of the object or living being of interest and other objects in the composite image, and occlusion of or by other objects or living beings. Such aid may take the form of a request that the user trace/circumscribe the object or living being of interest in the composite image, or point (e.g., using a stylus or finger on a touch-sensitive screen, or using an on-screen cursor controlled by a joystick, trackball, touchpad, or mouse) to select/click to identify specified locations on the image of the object or living being of interest, or on parts of surrounding background objects or living beings (e.g., the skin or clothing of another person, a point on a wall or floor, the fabric of the chair in which their image is seated). In this manner, additional information may be gathered to allow the more efficient or effective analysis of the composite image.

In a representative embodiment of the present invention, a set of motion templates may be defined, where each motion template describes the typical movement of a selected set of anatomical features or reference points for an object or living being such as, for example, a human or animal, while the object or living being is engaged in a particular activity involving motion of the set of anatomical features such as, for example, walking, running, climbing, clapping, swimming, and flying, to name just a few. A motion template may, for example, be defined as a set of relative measurements of the movement of particular features such as, for example, the joints or endpoints of parts of the body of a living being like a human being, for example. Information for such motion templates may be derived from motions studies of the objects or living beings for which motion templates are desired.

It should be noted that although representative embodiments of the present invention are described with respect to the use of a particular example approach in recognizing and segmenting portions of an image and the underlying features that allow the generation of animated sequences, the use of any particular object recognition technique does not necessarily represent a specific limitation of the present invention, as other approaches to identify image features, body parts, and the associated underlying anatomical structure for animation may be employed, without departing from the spirit and scope of the present invention.

In some representative embodiments of the present invention, the analysis may be performed on the composite image containing the object or living being of interest and may act to identify the portions of the composite image that belong to the object or living being of interest. In other representative embodiments of the present invention, the analysis may be applied to a portion of the composite image following aid in identification of the boundary of the object or living being of interest by the user, as previously described, or by a computer algorithm that may be used to segment the composite image to reduce the amount of image data to be analyzed by a later applied step/algorithm.

To further illustrate some of the features of a representative embodiment of the present invention, a non-limiting example is now provided for a system for producing an avatar and/or animated sequence in accordance with the present invention. Having such a system at their disposal, a person (e.g., a boy, girl, man, or woman) may decide that they wish to play a game with a friend at a location remote from their own, using a personal computer with display, an Internet connection, and a video camera such as, for example, a "web cam." The game being played may, for example, be a card game involving two or more players, where a live image of each player appears in a portion of each player's display, showing each player with playing cards in their hands. The exact nature of the game and the players is not important. Let us assume that one of the players is not feeling well and has a cold or other illness, and that they would prefer not to have a picture of how they look and feel sent to the other players. Using a representative embodiment of the present invention, the player who is ill may choose to instead have an avatar created for them to represent them on the displays viewed by the other players. The player that is ill may begin by selecting a still image, or a frame from a video in which they appear, as the "composite image" described above, to be used in generating their avatar. The composite image used may have been previously stored, by way of example and not limitation, on their personal computer, on a digital camera or a smart phone, or on a remote, cloud-based image storage system such as Photo Stream from Apple Inc., or SkyDrive®, developed by Microsoft Corporation.

Once the player selects a suitable composite image in which they appear, a representative embodiment of the present invention may request the player to identify the selected composite image to the system, and to select the type of object or living being that the system is to animate. In the present example, the thing of interest in the composite image is a human being. In one representative embodiment of the present invention, the system may determine the boundaries of the player in the selected composite image by analyzing the composite image and identifying/recognizing portions of the player's body using, for example, an appropriate object recognition approach, augmented as described above. For example, the system may have a number of object recognizers available for a number of different objects or living beings including, by way of example and not limitation, human beings, dogs, cats, horses, birds, cars, and bicycles. To further identify the most appropriate object recognizer to use in the analysis of an image of the user, the user may be requested to identify one or more characteristic about themselves such as, for example, their sex and their age. In some representative embodiments of the present invention, the player that is ill may also be requested to identify the lighting conditions of the image (e.g., indoor or outdoor, and dim lighting, normal lighting, or bright sunlight), and whether they are standing or seated in the selected composite image. Following analysis, the system may visually identify to the player on a display, the composite image being analyzed, with those portions of the composite image corresponding to recognized objects outlined, boxed, or conspicuously colored, to show the portions of the composite image recognized by the analysis.

Continuing with the present illustrative example, once portions of the selected composite image have been recognized, the player may be asked to select a motion template to be used in animating the avatar. For example, a representative embodiment of the present invention may have a number of motion templates to use in animating an avatar such as, by way of example and not limitation, motion templates suitable for use in creating animations that include walking, running, galloping, climbing, clapping, swimming, flying, and for this example, various hand and finger movements that may be used while playing cards. One or more thresholds or conditions may be applied to determine whether an appropriate/sufficient collection body parts or image portions have been recognized in the composite picture to enable the generation of the avatar for the requested animation. For example, if a particular minimum set of body parts that includes the reference points needed for animation of the galloping of a horse have not been recognized in a composite image including a horse, a representative embodiment of the present invention may inform the user that the selected animation (i.e., galloping of a horse) cannot be created. In such an instance, the user may be requested to aid the system in identifying the image portions needed to create the avatar. In the present example, recognition of image portions corresponding to the head, upper body, arms, hands, and fingers may be sufficient to create an avatar able to present the movements of a person involved in playing cards. In a representative embodiment of the present invention, each recognized image portion having associated reference points to be animated by a particular motion template may have an associated parameter that indicates the importance of recognition of the corresponding portions of the body of the object or living being of interest for that motion template, and the animation according to the motion template may not be created if the importance of recognition of a certain body part is above a particular threshold.

Once recognition of a sufficient collection of body parts has occurred, a representative embodiment of the present invention may animate the recognized portions of the composite image according to the motion of the reference points identified in the motion template that correspond to the reference points of the underlying structural elements (e.g., skeletal parts) for the recognized body parts. For example, an object recognizer may be employed that is trained to recognize, for example in a human being, a lower portion of the left upper arm, the left elbow, and an upper portion of the lower left arm. The locations of the ends of the underlying bones and the common joint (i.e., the elbow joint) may be defined as reference points associated with the recognized body parts (e.g., relative to a reference point or keypoint of the recognized body parts). Additional information related to, for example, anatomically adjacent body parts may also be available. In a representative embodiment of the present invention, the texture information and/or other information for the recognized portion of the composite image may be mapped onto a surface of a movable model animated according to the motion defined by corresponding reference points of a motion template for a human being while, for this example, dealing a card. By animating each portion of the movable model according to the motion of the reference points for the recognized body part as defined by the user-selected motion template, a collection of portions of the composite image corresponding to the collection of recognized body parts may be animated. Although, in some representative embodiments of the present invention, this approach may not result in an animation that may be mistaken for the actual player, the matching of visual details (e.g., fabric patterns, colors, shading, creases due to motion, and other features) may be further optimized, and may be suitable as described for use in children's games, cartoon-like sequences, and other forms of entertainment. In other representative embodiments of the present invention, the animation may be quite good.

In some representative embodiments of the present invention, the image of the object or living being to be animated may first be extracted from the composite image using a first object recognition or image segmentation technique, before analysis using a second object recognition or image segmentation technique is performed. As previously discussed above, in some representative embodiments of the present invention, a composite image may first be processed using an algorithm such as, by way of example and not limitation, a "texton"-based approach to recognize objects in the image and to segment the image, for further processing using an algorithm such as, by way of example and not limitation, that of a "poselet"-based approach. In such an embodiment, object recognition and extraction of the object or living being to be animated from the composite image and image segmentation may improve the likelihood of success of the analysis and speed of generation of the animation, reducing the complexity of the problem at hand by limiting the amount of the image content of the composite image that must be processed.

Figure 2:
FIG. 2 shows an exemplary composite image of a group of four individuals that a user may wish to employ as a source image to be used in the creation of an avatar and/or an animated sequence, in accordance with a representative embodiment of the present invention.

FIG. 2 shows an exemplary composite image 200 of a group of four individuals that a user may wish to employ as a source image to be used in the creation of an avatar and/or an animated sequence, in accordance with a representative embodiment of the present invention. Although the composite image 200 has a relatively uniform background, this is for reasons of simplicity and clarity of illustration, and does not necessarily represent a specific limitation of the present invention. The four individuals in the composite image 200 do exhibit some occlusion.

Figure 3:
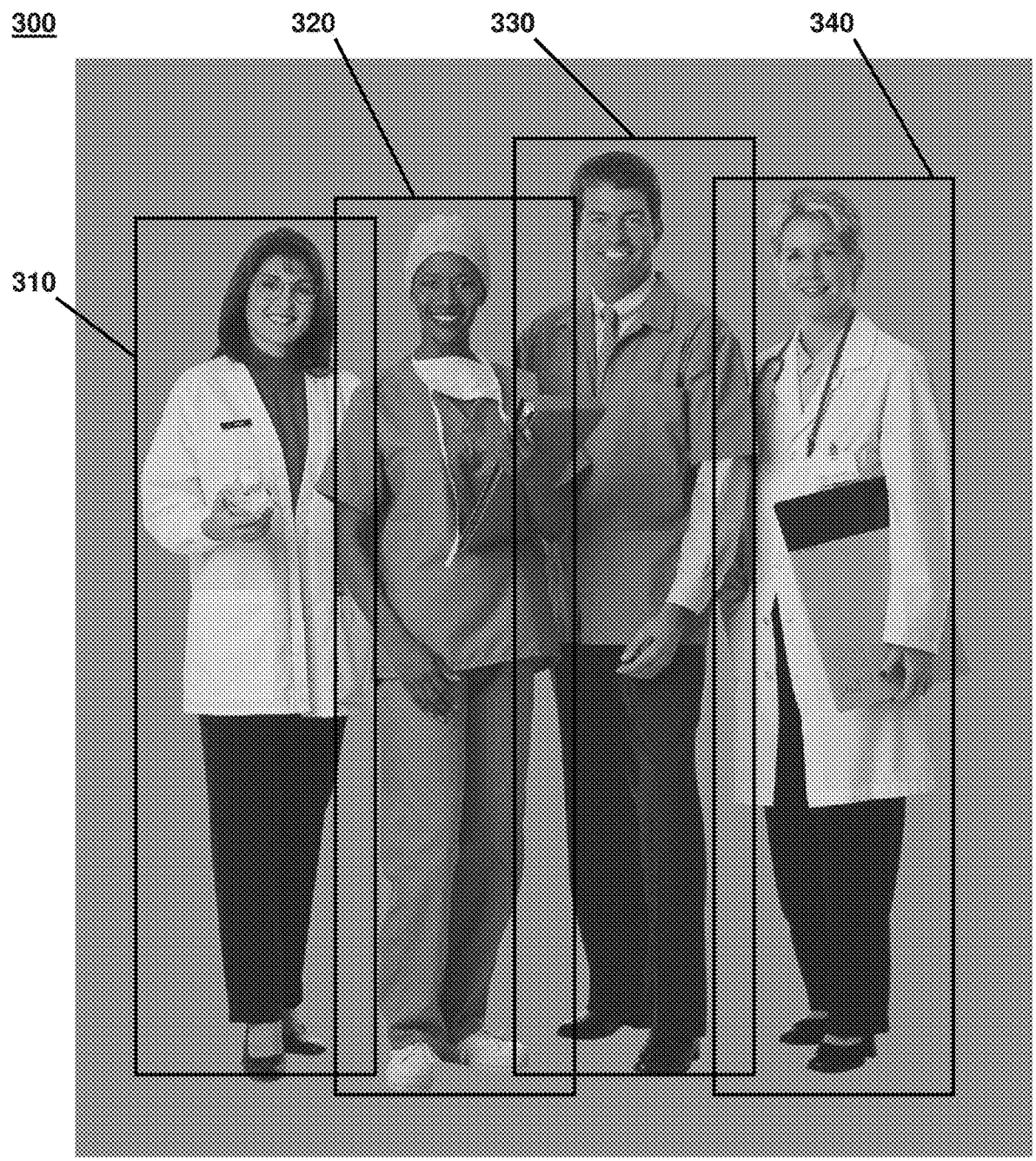
FIG. 3 shows a composite image that may, for example correspond to the composite image of FIG. 2, in which bounding boxes are displayed that identify four sub-images that have been recognized or interpreted as a human being by an image segmentation or object recognition algorithm, in accordance with a representative embodiment of the present invention.

FIG. 3 shows a composite image 300 that may, for example correspond to the composite image 200 of FIG. 2, in which bounding boxes 310, 320, 330, 340 are displayed that identify four sub-images that have been recognized or interpreted as a human being by an image segmentation or object recognition algorithm, in accordance with a representative embodiment of the present invention. The object recognition or image segmentation technique employed may be any of a number of other suitable approaches known in the art, used separately and/or in combination, as previously described. Occlusion of two of the four individuals upon others, and of objects upon the illustrated individuals may represent situations where a representative embodiment of the present invention may request user intervention, to aid in identification of a boundary separating each image portion of a human being from another, or the background. The result of image segmentation such as that illustrated in FIG. 3 results in the identification of four sub-images that may be of interest to the user in creating a desired avatar and/or animated sequence.

Figure 4:
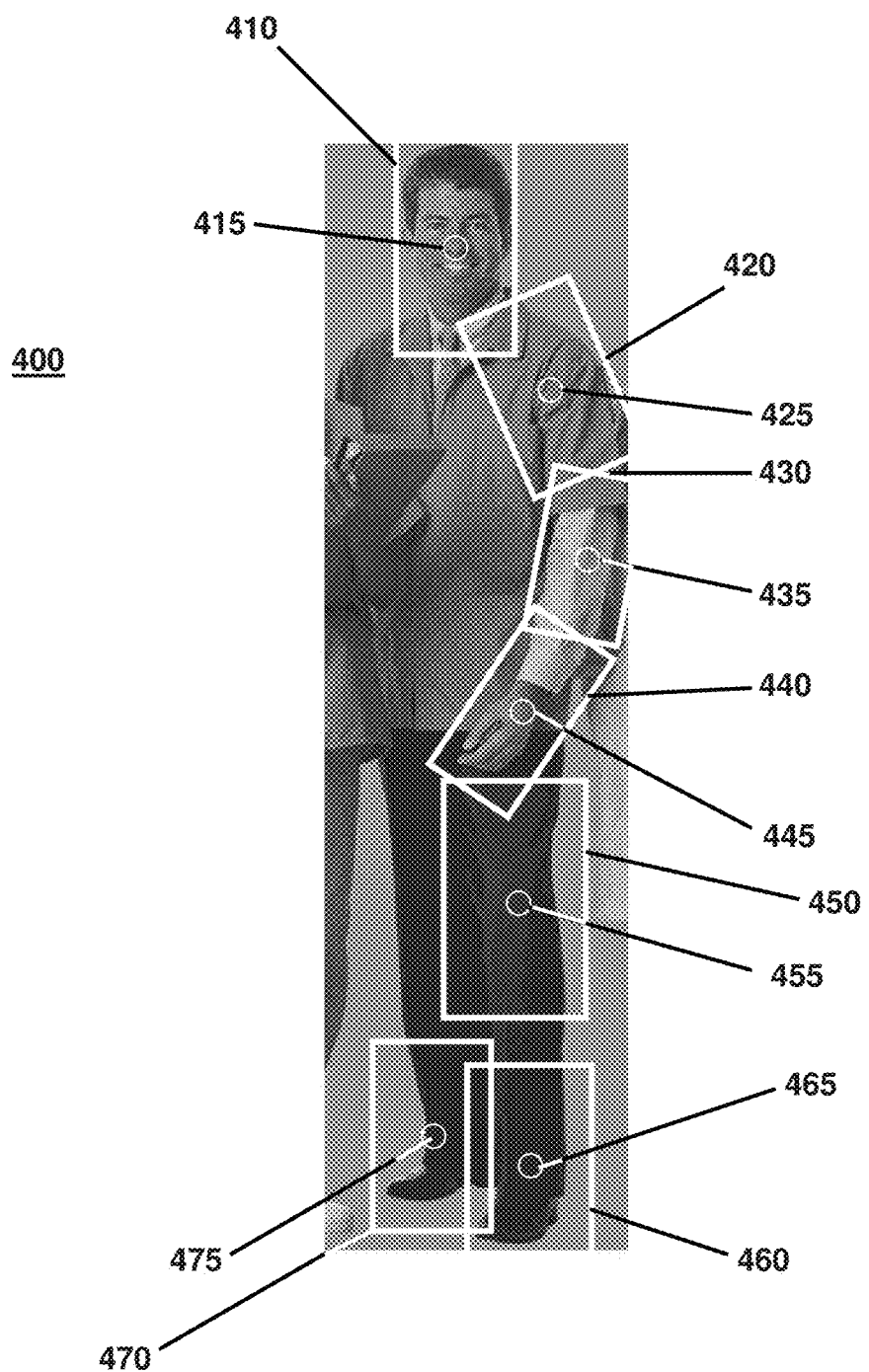
FIG. 4 shows an image that may correspond, for example, to the sub-image contained within the bounding box of FIG. 3, in accordance with a representative embodiment of the present invention.

FIG. 4 shows an image 400 that may correspond, for example, to the sub-image contained within the bounding box 330 of FIG. 3, in accordance with a representative embodiment of the present invention. As illustrated in FIG. 4, a number of bounding boxes 410, 420, 430, 440, 450, 460, 470 have been displayed on the image 400 to illustrate the recognition or interpretation of portions of the image 400 by a second algorithm designed to recognize portions of the body of a human being. It should be noted that the bounding boxes 410, 420, 430, 440, 450, 460 470 of FIG. 4 are merely one visual method of indicating recognition or interpretation of portions of an image. It should further be noted that, for reasons of simplicity and clarity, the illustration of FIG. 4 shows bounding boxes for only a few of the parts of the body that may be recognized by a representative embodiment of the present invention. The bounding box 410 may be displayed in response to, for example, identification or recognition by an object recognizer trained to recognize the head of a human being. A previously described, an object recognition algorithm may be employed that may recognize various different views of the same portion or part of an object or living being. In a similar fashion, the bounding box 420 may be displayed in response to recognition of the portion of a human being including the left shoulder and upper left arm, and the bounding box 430 may be displayed in response to recognition of a portion of a human body including the lower portion of the upper left arm, the left elbow, and the upper portion of the lower left arm. The bounding box 440 may be displayed in response to recognition of a portion of a human body including the left hand and lower portion of the lower left arm, and the bounding box 455 may be displayed in response to recognition of a portion of a human body including the lower portion of thigh, the left knee, and the upper portion of the left calf. Finally, the bonding boxes 460, 470 may be displayed in response to recognition of, respectively, a left foot and ankle, and a right foot and ankle.

The illustration of FIG. 4 also shows a respective single reference point 415, 425, 435, 445, 455, 465, 475 for each of the bounding boxes 410, 420, 430, 440, 450, 460, 470. The reference points 415, 425, 435, 445, 455, 465, 475 represent the approximate location of a feature of the underlying anatomical structure of the object or living being (i.e., in this example, a human being) to be animated, and correspond to matching reference points of movable model onto which texture information from the recognized portions of the image 400.

Figure 5:
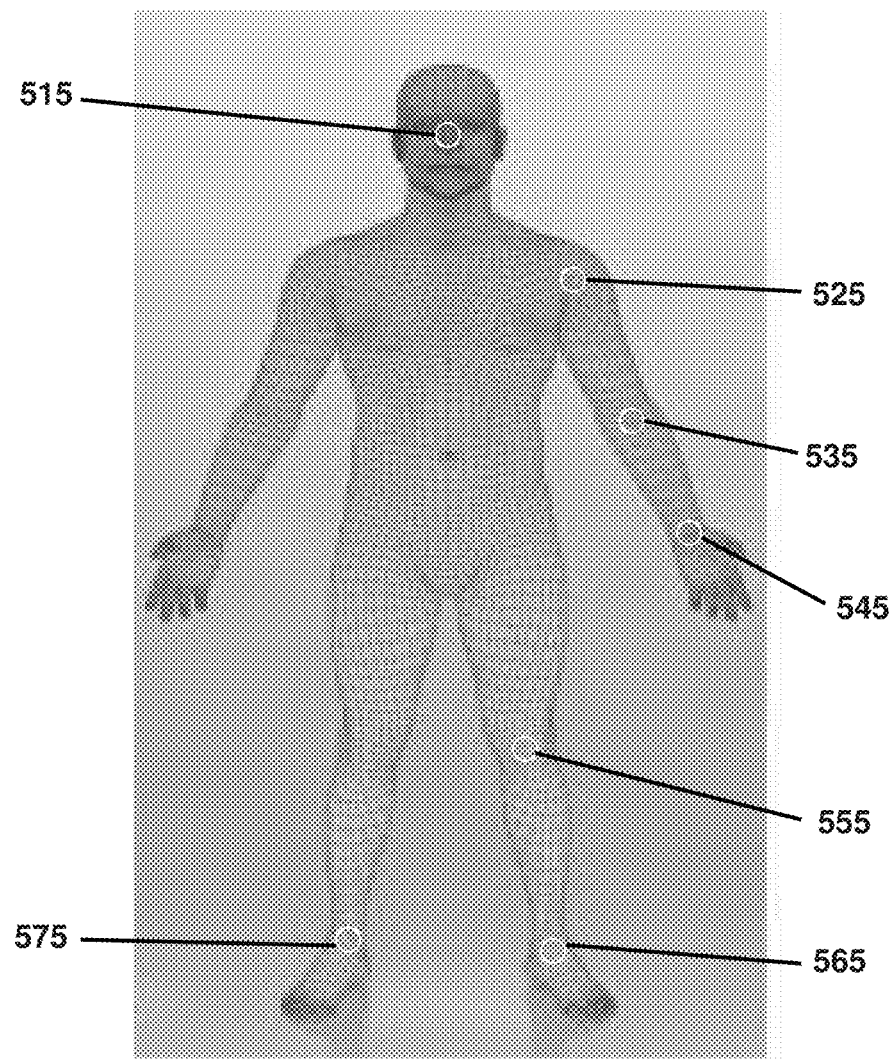
FIG. 5 shows an illustration of a meshed polygon model of a human being showing the locations of reference points that may correspond respectively to, for example, the reference points of the recognized image portions represented by the bounding boxes illustrated in FIG. 4, in accordance with a representative embodiment of the present invention.

FIG. 5 shows an illustration of a meshed polygon model 500 of a human being showing the locations of reference points 515, 525, 535, 545, 555, 565, 575 that may correspond respectively to, for example, the reference points 415, 425, 435, 445, 455, 465, 475 of the recognized objects represented by the bounding boxes 410, 420, 430, 440, 450, 460, 470 illustrated in FIG. 4, in accordance with a representative embodiment of the present invention. Although not shown in the illustration of FIG. 5 for reasons of clarity, texture information and/or other information taken from portions of the image 400 of FIG. 4 corresponding to the recognized body part images of the bounding boxes 410, 420, 430, 440, 450, 460, 470 may be mapped to the surfaces of the corresponding portions of meshed polygon model 500, creating an avatar of the object or living being depicted in the image 400 of FIG. 4. It should further be noted that, for reasons of simplicity and clarity, the illustration of FIG. 5 shows only a subset of the reference points of the model that may be used by a representative embodiment of the present invention.

In a representative embodiment of the present invention, as discussed above, motion information corresponding to each of the references points 515, 525, 535, 545, 555, 565, 575 taken from a motion template selected by a user of a representative embodiment of the present invention may be used to define movement (i.e., changes in position/pose) of those reference points of the meshed polygon model 500, thereby enabling rendering, at system or user-selected intervals of motion, of one or more images of an animation of the model 500, and generating an animated sequence of an avatar. The animated sequence of the avatar may then be composited with a system or user-selected background to create an animated composite image. A similar approach may be employed in the creation of avatars and/or animated sequences of other objects or living beings such as, for example, an animal such as a dog, cat, or horse, or an object such as, for example, a bicycle, car, locomotive, or airplane.

In a representative embodiment of the present invention, the system may use the available information about an object or living being of interest and attempt to recognize and identify to the user (e.g., by displaying a bounding outline, border, or bounding box) the objects or living beings which the system has recognized in an image. With some images (e.g., due to similarity of color content, lighting conditions, and occlusion of portions of the object or living being of interest by other objects or living beings in the selected image), the system may be unable to recognize in the image a sufficient amount of the image as belonging to one or more particular objects or living beings known to the system. In such instances, the system may prompt the user to indicate (e.g., using a cursor controlled by a touch-sensitive surface or display, a track ball, joystick, or a mouse) the objects or living beings of interest to the user. The user may then simply place a cursor on the object or living being of interest and click/select, draw a line that encloses the object or thing of interest, or trace the boundary that separates the object or living being of interest from the background. The image of the object or living being of interest may then be extracted from the composite image.

A representative embodiment of the present invention may then analyze the extracted image and identify particular portions of the image, where each identified portion has associated with it, information identifying underlying features of the portion of the skeleton or structure (e.g., the bones and joints, structural elements and points at which relative motion of the structural elements can occur) within the identified/recognized(?) boundaries of the particular portion of the image (e.g., the portion identified by the object recognizer). For example, the system presently discussed may analyze the selected image and recognize portions of the upper body of the user, and in particular, may recognize, for example, the head and neck; each shoulder and a portion of the respective upper arm; a remaining portion of each upper arm, respective elbow, and a portion of the respective lower arm, and remaining portion of each lower arm and respective hand.

It should be noted that the example presented above is for purposes of illustration, and does not necessarily represent specific limitations of the present invention, unless recited by the claims, and that an animated sequence that comprises multiple avatars may be created using the described techniques. For example, image information for various assortments of people, pets, and object(s) may be extracted from one or more still images and/or video content, and may be animated by like or different motion information to create an animated sequence.

Figure 6:
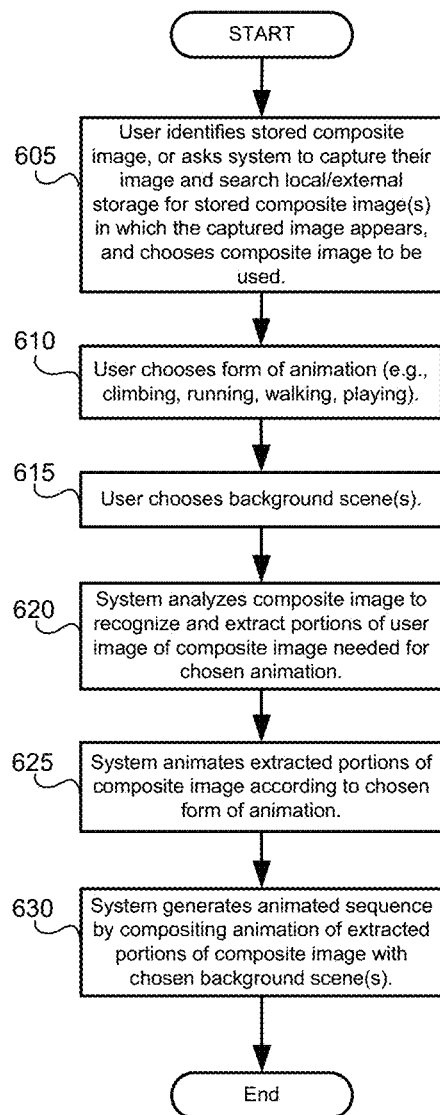
FIG. 6 is a flowchart illustrating an exemplary method of operating a system for creating an animated sequence from a still image, in accordance with a representative embodiment of the present invention.

FIG. 6 is a flowchart 600 illustrating an exemplary method of operating a system for creating an animated sequence from a still image, in accordance with a representative embodiment of the present invention. The following description of the method of FIG. 6 may make reference to the elements of FIG. 1. The method of FIG. 6 begins when a user wishes to create an animation using their own image. At block 605, the user may identify a stored composite image they wish to use, or may ask a system such as the PCs 110, 115 or communication device 125 of FIG. 1 to capture an image of their own face or that includes their own face, and to search local and/or external storage for stored composite image(s) in which the captured image appears, or those associated with their name or other information that identifies them. The search may include, for example, the storage devices of PCs 110,115, the memory of the user communication device 125, images stored on the computer system 150, or those images available on or via the web server 170. The user may then choose from the retrieved composite image(s) to select a composite image to be used in creating the animation.

Next, at block 610, the user may choose a form of animation to be created. For example, the user may wish to be animated as climbing a mountain or up a sheer rock cliff, paddling a canoe, riding a bicycle, walking up the side of the Eiffel Tower, riding a bike on the Tour de France, to name only a few activities. Then, at block 615, the user may choose the background to be used for the animation. Suitable backgrounds may reside on the storage and memory identified above, which may be searched based on identified locations (e.g., Mt. Everest, Red Square, The Indianapolis Motor Speedway) or by one or more descriptive characteristics (e.g., a cliff, a river, a skyscraper, a street, a bare tree).

At block 620, a system in accordance with the present invention then analyzes the composite image submitted by the user, to recognize and extract portions of the user image of composite image needed for the chosen animation. The analysis may be performed in the device employed by the user to interface with the system such as, for example, a personal computer such as a tablet computer, one of the PCs 110,115, or the user communication device 125 of FIG. 1, it may be done at the computer system 150, or the task of analysis may be shared across two or more elements of the system of FIG. 1 including remote computing resources accessed via web or other communication method. Next, at block 625, elements of the system (e.g., the system 100 of FIG. 1) may animate the extracted portions of composite image according to the user chosen form of animation, as has been described in greater detail above. Again, the animation may be performed by a personal computer such as a tablet computer, one of the PCs 110,115, or the user communication device 125 of FIG. 1, it may be done at the computer system 150, or the task may be shared across two or more elements of FIG. 1, including remote computing resources. Finally, the method of FIG. 6 continues at block 630, at which the system generates the desired animated sequence by compositing animation of the extracted portions of the composite image selected by the user, with the chosen background scene.

Additional aspects of a representative embodiment of the present invention may be seen in a system that continuously monitors various sources of news and social traffic including, for example, news sources (e.g., Associated Press (AP), Reuters), social media (e.g., Twitter®, Facebook®), RSS (rich site summary) newsfeeds, blogs (e.g., Huffington Post), news websites (e.g., newspaper and television network web sites), and bulletin boards, to determine currently trending topics using any of a number of known approaches. Depending on the nature and subject area of the currently trending topics (e.g., entertainment, weather, sports, finance, crime, housing, health and medical), the system may gather pictures attached to or associated with textual content about or related to certain trending topics. Such information may be analyzed and classified by the system to determine subject matter, level of importance and timeliness, global/local relevance, and mood (e.g., "light", uplifting, happy, financial, aggression, conflict, social/celebrity/public figure, government, severe weather/natural disaster, etc.), using textual content and/or analysis of accompanying images and/or image captions.

A representative embodiment, using the gathered information about trending topics may then select one or more questions that it presents to a user of the system via a visual display of text, or playing of audio (e.g., stored or computer-generated speech). For example, on a day on which the top trending topics relate to military conflict and/or war, the system may ask the user "Do you feel like fighting today?", while on a day on which the trending topics relate to lighter, more pleasant world events, the system may ask "Are you feeling happy today?". If a trending topic relates to a particular celebrity, the system may ask "Would you like hang out with <celebrity name>today?". The system may ask a series of questions based on responses to earlier questions, to further ascertain the mood and/or interests of the user.

In one representative embodiment of the present invention, the user may respond to each posed question using, for example, text at a keyboard or by, by way of illustration and not limitation, selecting a "Yes" or "No" answer or an answer to a multiple choice question on a screen, using a mouse or touch-sensitive display. In another representative embodiment, the user may respond verbally, and their audio response may be captured by a microphone integrated within or attached to the computer, smart phone, or other device that they are using. If the response is made verbally, some representative embodiments of the present invention may perform a "voice stress analysis" upon the user's audio response, to determine the effects of the question(s) and the underlying emotions or general emotional state that the user is feeling. In yet another representative embodiment, the system may employ an imaging device to capture a series of images of the end-user, and may analyze those images to determine the mood/emotion/feelings of the end-user. Such a series of images may be captured using a front or user-facing camera of an electronic user device such as a smart phone or tablet computer at various times of use, such as following start up, or when surfing particular web sites, or when the functionality for creating avatars and/or animated sequences is activated for a session of use. The details of suitable algorithms for determining mood and emotion based on voice stress and image analysis of a human being are well known and beyond the scope of the present application, and the details of such algorithms will not be discussed here. In a representative embodiment of the present invention, such information may then be used in the creation of an avatar and/or animated sequence.

Based on the response of the user to the question(s) posed by the system, and in some cases their mood or emotional state, a representative embodiment of the present invention may retrieve one or more images related to particular topics found to be trending topics over the past hours, days, or weeks that relate to their answers. For example, if the most active topic of the gathered news relates to war and military conflict, and the user responded "Yes" when asked the question "Do you feel like fighting," the system may create an avatar of the user (e.g., created as described above) and place it into a scene with images of individuals taken from one or more images related to the areas of conflict (e.g., fighting in the Middle East, or civil riots in Indonesia). If, however, the most active topic of the gathered news related to a happy social event of the British Royal Family, and the user responded "Yes" when asked "Are you feeling happy today?" or "Would you like to hang out with Princess Kate (Middleton) of the Royal Family?", the system may create an avatar of the user and place it in a scene with images of Princess Kate and other members of the Royal Family taken from gathered images of the happy social event of the Royals. In a representative embodiment of the present invention, the background image may, for example, be selected from one or more still images or video content identified during a search of sources on the Internet, or on the personal computer or handheld devices of the user or other suitable sources, based on tags attached to the images/video, or captions/sub-headers associated with the images/video. In addition, images and/or video content may be specifically created by a third party for the purpose of allowing users to choose to have their avatar take part in an activity with various public personalities such as, for example, a talk show or other activity in which the avatar of the user interacts with (e.g., is interviewed by) an actual image or a system-generated avatar of a well-known public figure/celebrity.

In some representative embodiments of the present invention, the mood of the user, as may be determined from user responses to questions posed by the system, and/or by the results of a voice stress analysis performed on audio responses of the user, may be used in adjusting/modifying aspects of an avatar of the user. For example, if the user of the system has indicated that they feel happy, the system may adjust facial details to show their avatar as smiling, and/or may adjust/select motion information used to animate the avatar to reflect the happy mood of the user by, for example, showing the avatar posture as erect and moving briskly. In contrast, if the user of the system has indicated that they feel sad, angry, aggressive, aspects of the avatar may be adjusted/selected to reflect appearance and/or behavior matching the mood of the user (e.g., shoulders slumped and a sad face, and moving slowly, if the user is determined to be unhappy or sad).

The techniques described above may also be used in an educational setting. The use of online classes at vocational training schools, colleges, universities, adult high schools, and other educational settings is rapidly growing. Using the techniques for creating an avatar and/or an animated sequence described above, on online education system may create an avatar for each student, placing them in a virtual reality setting of a classroom, with other course participants. The student may be provided with a 360 degree view of the virtual classroom and the avatars of the other course participants, and may raise the hand of their avatar to ask a question using, for example, a mouse click, a gesture on a touch-sensitive screen, or one or more characters on a keyboard. Participants may choose to have their avatars based on images captured at the start or before the start of class, or may elect to have their avatar created from one or more previously stored images retrieved, as described above.

Figure 7:
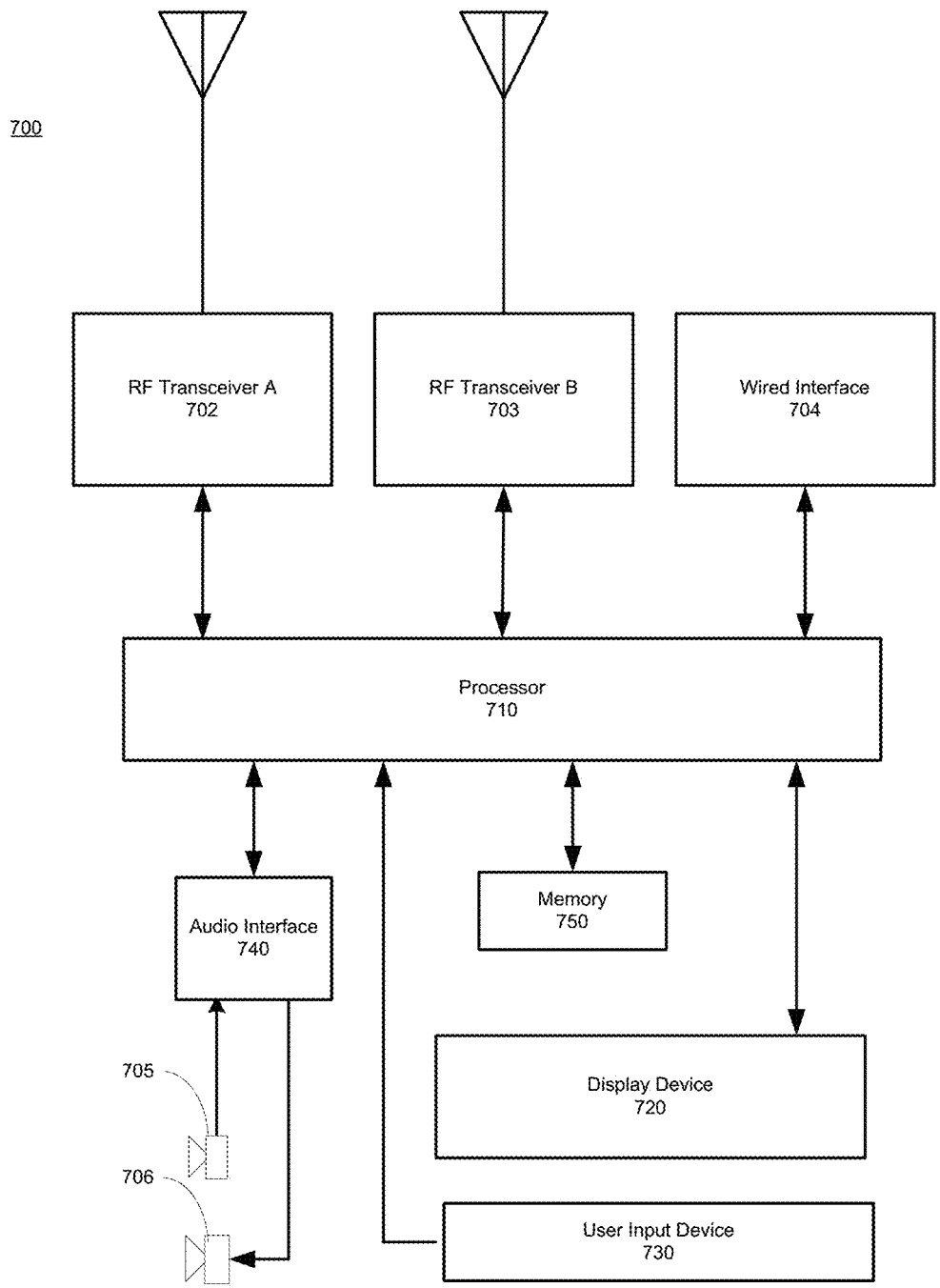
FIG. 7 is a block diagram illustrating a personal electronic device that may correspond, for example, to electronic devices shown in FIG. 1, in accordance with a representative embodiment of the present invention.

FIG. 7 is a block diagram illustrating a personal electronic device 700 that may correspond, for example, to electronic devices shown in FIG. 1, in accordance with a representative embodiment of the present invention. The personal electronic device 700 may correspond to electronic user devices such as, by way of example and not limitation, a smart phone, a tablet computer, a cellular phone, a media player, a handheld personal computer, a laptop, a notebook computer, a netbook computer, a desktop computer, a television, or any other suitable electronic device having the functionality discussed herein.

As shown in FIG. 7, the personal electronic device 700 includes a processor 710, an RF transceiver A 702, an RF transceiver B 703, a wired interface 704, a display device 720, a user input device 730, an audio interface 740, and a memory 750. The processor 710 may be, for example, a suitable microprocessor or microcomputer having sufficient computing power to control the personal electronic device 700, and is operably coupled to the RF transceiver A 702, the RF transceiver B 703, and the wired interface 704. The RF transceiver A 702 and RF transceiver B 703 may comprise any necessary circuitry, logic, and software/firmware for wireless communication over any of, for example, the cellular, Bluetooth, Wi-Fi (e.g., IEEE 802.11 a/b/g/n/ac), Zigbee, WiMAX, or any other wireless network known now or in the future. The wired interface 704 may comprise any necessary circuitry, logic, and software/firmware for wired communication over any of, for example, an Ethernet, Universal Serial Bus, FireWire (IEEE 1394) or other wired networks known now or in the future.

The processor 710 is also operably coupled to the memory 750, and may be used for non-transitory storage of executable program instructions, parameters, and data for any of the circuitry of the personal electronic device 700. The display device 720 is also operably coupled to the processor 710, and may comprise, for example, one or more LED, OLED, LCD, or other form of visual display capable of presenting text or graphics, and may comprise any circuitry, logic, or software/firmware to support, for example, a graphical user interface (GUI). The user input device 730 may comprise, for example, suitable switches, buttons, or touch sensitive surfaces to enable user control and operation of the personal electronic device 700, and may comprise any necessary circuitry, logic, and software/firmware to allow it to perform those functions. In a representative embodiment of the present invention, the user input device 730 may be a touch sensitive surface at the viewing side of the display device 720, enabling a user to use the touch sensitive surface of the display device to enter user inputs and respond to displayed information. The audio interface 740 comprise any necessary circuitry, logic, and software to interface a microphone 705 and a speaker 706 to the processor 710.

Aspect of a representative embodiment of the present invention may be found in a method of operating a system for creating an animated sequence of images from one or more still images of an object or a living being. Such a method may comprise extracting one or more portions of an image of the object or the living being from the one or more still images, and applying the one or more portions of an image of the object or the living being to corresponding surface portions of a mathematical model created using physical characteristics of a plurality of objects or living beings like the object or the living being. The method may also comprise animating the mathematical model according to motion information selected by a user of the system, rendering one or more images from the mathematical model at corresponding positions of the animation, and transmitting the one or more rendered images for display. The one or more still images may be retrieved from one or both of the system and a source external to the system, using matching of an image comprising the object or the living being.

In a representative embodiment of the present invention, the method may also comprise capturing a plurality of news items from two or more news sources, where each news item comprises text and image data, and classifying each of the plurality of news items according to one or more characteristics. The method may further comprise determining one or more of a feeling, a mood, and an emotion of a user of the system, and selecting a news item from the plurality of news items according to the one or more of a feeling, a mood, and an emotion. The text may comprise a description of an event represented by the image data, and the one or more characteristics may be representative of the event or the one or more characteristics may be representative of a feeling, a mood, or an emotion associated with the event. The one or more of a feeling, a mood, and an emotion of the user may be determined from one or both of tactual user input and a facial image of the user.

In various representative embodiments of the present invention, determining the one or more of a feeling, a mood, and an emotion of a user may comprise capturing one or more images of the user and analyzing the one or more images of the user. Aspects of one or both of the mathematical model and the animation may be modified according to the one or more of a feeling, a mood, and an emotion of the user. The modification may comprise one or both of morphing a facial feature and adjusting animation based on the one or more of a feeling, a mood, and an emotion, and the mathematical model may be a three dimensional mathematical model. Rendering the one or more images from the mathematical model may comprise combining the one or more rendered images with image data of the selected news item.

Extracting may comprise segmenting each of the one or more still images to define one or more sub-images in which the object or the living being appears, performing object recognition upon the one or more sub-images to identify the one or more portions of an image of the object or the living being, and extracting image data of the one or more portions from the one or more sub-images. The user may be prompted to provide assistance in segmenting the one or more still images into the one or more sub-images.

Further aspects of a representative embodiment of the present invention may be seen in a system for creating an animated sequence of images from one or more still images of an object or a living being. Such a system may comprise at least one processor communicatively coupled to a display device, where the at least one processor is operable to, at least, extract one or more portions of an image of the object or the living being from the one or more still images, and apply the one or more portions of an image of the object or the living being to corresponding surface portions of a mathematical model created using physical characteristics of a plurality of objects or living beings like the object or the living being. The at least one processor may also be operable to animate the mathematical model according to motion information selected by a user of the system, to render one or more images from the mathematical model at corresponding positions of the animation, and transmit the one or more rendered images to the display device.

In a representative embodiment of the present invention, the at least one processor may be operable to, at least, determine one or more of a feeling, a mood, and an emotion of a user by capturing a plurality of images of the user and analyzing the plurality of images, and adjust a portion of the mathematical model according to the one or more of a feeling, a mood, and an emotion of the user. Extracting one or more portions of an image of the object or the living being from the one or more still images may comprise recognizing an image of the object or the living being of a first size, using a first algorithm, and recognizing an image portion of a second size less than the first size in the recognized image of the object or the living being, using a second algorithm. The animation of the mathematical model may be adjusted according to one or more of a feeling, a mood, and an emotion of the user.

Additional aspects of a representative embodiment of the present invention may be observed in a non-transitory computer-readable medium having stored thereon a plurality of codes sections, each code section comprising executable instructions. The plurality of code sections may create an animated sequence of images from one or more still images of an object or a living being by, at least, extracting one or more portions of an image of the object or the living being from the one or more still images, and applying the one or more portions of an image of the object or the living being to corresponding surface portions of a mathematical model created using physical characteristics of a plurality of objects or living beings like the object or the living being. In addition, the plurality of code sections may create the animated sequence by animating the mathematical model according to motion information selected by a user of the system, rendering one or more images from the mathematical model at corresponding positions of the animation, and transmitting the one or more rendered images to a display device.

The plurality of code sections may create an animated sequence of images from one or more still images of an object or a living being by, at least, determining one or more of a feeling, a mood, and an emotion of a user by analyzing a response of the user, and adjusting the animation according to the one or more of a feeling, a mood, and an emotion of the user. The response of the user may be spoken, and the analyzing may comprise voice stress analysis.

Although devices, methods, and systems according to the present invention may have been described in connection with a preferred embodiment, it is not intended to be limited to the specific form set forth herein, but on the contrary, it is intended to cover such alternative, modifications, and equivalents, as can be reasonably included within the scope of the invention as defined by this disclosure and appended diagrams.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method comprising:
at an electronic device including one or more processors, a non-transitory memory, and one or more displays, wherein the one or more processors comprise motion hardware and rendering hardware:
generating current avatar content according to images of human body features extracted from one or more still images of a user, other individuals, and other objects;
while presenting the current avatar content via the one or more displays, allowing the one or more processors to convey a state of the user by:
obtaining information associated with the user, wherein:
the information corresponds to an emotion and/or a mood of the user, and
the information is sensed via an analysis of underlying emotion in the user's voice;
determining the state of the user according to the information associated with the user;
modifying the state of the user, in response to an input from the user; and
generating modified avatar content to display the state of the user according to a user model associated with the user, the state of the user, and the current avatar content, wherein the user model provides movement to the modified avatar content, via the motion hardware, wherein the movement is according to a motion template comprising a time ordered series of vectors;
presenting, via the rendering hardware and the one or more displays, the modified avatar content, wherein the rendering hardware is configured to generate the modified avatar content according to the motion template;
after presenting the modified avatar content, obtaining the information associated with the user, wherein the information corresponds to one or more tactual user inputs;
determining an updated state of the user according to the tactual user inputs, wherein determining the updated state of the user comprises determining whether the user consents to an appearance of the modified avatar content; and
updating the user model according to the updated state of the user and the modified avatar content.

2. The method of claim 1, comprising:
obtaining the tactual user inputs associated with the user via one or more user input devices of the electronic device.

3. The method of claim 1, wherein the information associated with the user comprises a measurement of at least one detail of an eye of the user, a mouth of the user or a body pose of the user.

4. The method of claim 1, wherein generating modified avatar content is associated with actions of the user model.

5. The method of claim 1, comprising:
obtaining user information from the user model stored on the non-transitory memory of the electronic device.

6. The method of claim 1, comprising:
storing user information in the user model on the non-transitory memory of the electronic device.

7. The method of claim 1, wherein obtaining information associated with the user comprises obtaining a facial image of the user.

8. The method of claim 1, comprising:
detecting movement of a face of the user; and
updating a representation of the face of the user according to image data of the face of the user captured by one or more cameras of the electronic device.

9. An electronic device comprising:
one or more processors comprising motion hardware and rendering hardware;
one or more displays;
a non-transitory memory; and
one or more programs stored in the non-transitory memory, which, when executed by the one or more processors, cause the electronic device to:
generate current avatar content according to images of human body features extracted from one or more still images of a user, other individuals, and other objects;
present the current avatar content via the one or more displays and the rendering hardware;
specify a state of the user by:
obtaining information associated with the user, wherein:
the information corresponds to an emotion and/or a mood of the user, and
the information is sensed via an analysis of underlying emotion in the user's voice,
determining the state of the user according to the information associated with the user,
modifying the state of the user, in response to an input from the user, and
generating modified avatar content to display the state of the user according to a user model associated with the user, the state of the user, and the current avatar content, wherein the user model provides movement to the modified avatar content, via the motion hardware, wherein the movement is according to a motion template comprising a time ordered series of vectors;
present, via the rendering hardware and the one or more displays, the modified avatar content, wherein the rendering hardware is configured to generate the modified avatar content according to the motion template
obtain the information associated with the user, wherein the information corresponds to one or more tactual user inputs;
determine an updated state of the user according to the tactual user inputs, wherein determining the updated state of the user comprises determining whether the user consents to an appearance of the modified avatar content; and
update the user model according to the updated state of the user and the modified avatar content.

10. The system of claim 9, wherein:
the tactual user inputs associated with the user are obtained via one or more user input devices of the electronic device.

11. The system of claim 9, wherein the information associated with the user comprises a measurement of at least one detail of an eye of the user, a mouth of the user or a body pose of the user.

12. The system of claim 9, wherein generating modified avatar content is associated with actions of the user model.

13. The system of claim 9, wherein:
user information from the user model is obtained from the non-transitory memory of the electronic device.

14. The system of claim 9, wherein:
user information in the user model is stored on the non-transitory memory of the electronic device.

15. The system of claim 9, wherein:
information associated with the user comprises a facial image of the user.

16. The system of claim 9, wherein, when executed by the one or more processors, the one or more programs stored in the non-transitory memory cause the electronic device to:
detect movement of a face of the user; and
update a representation of the face of the user according to image data of the face of the user captured by one or more cameras of the electronic device.

\* \* \* \* \*